United States Patent
Bojan

(10) Patent No.: US 11,042,625 B2
(45) Date of Patent: Jun. 22, 2021

(54) SYSTEM FOR VISUAL PASSWORD INPUT AND METHOD FOR ACCEPTING A VISUAL PASSWORD INPUT

(71) Applicant: William Bojan, Cape Coral, FL (US)

(72) Inventor: William Bojan, Cape Coral, FL (US)

( * ) Notice: Subject to any disclaimer, the term of this patent is extended or adjusted under 35 U.S.C. 154(b) by 235 days.

(21) Appl. No.: 15/911,487

(22) Filed: Mar. 5, 2018

(65) Prior Publication Data
US 2018/0253543 A1 Sep. 6, 2018

Related U.S. Application Data

(60) Provisional application No. 62/466,972, filed on Mar. 3, 2017.

(51) Int. Cl.
| | |
|---|---|
| *G06F 21/36* | (2013.01) |
| *G06K 9/00* | (2006.01) |
| *G06F 21/32* | (2013.01) |
| *G06T 17/05* | (2011.01) |

(52) U.S. Cl.
CPC ......... *G06F 21/36* (2013.01); *G06F 21/32* (2013.01); *G06K 9/0061* (2013.01); *G06K 9/00281* (2013.01); *G06K 9/00288* (2013.01); *G06K 9/00617* (2013.01); *G06K 9/00214* (2013.01); *G06T 17/05* (2013.01); *H04N 2201/3235* (2013.01)

(58) Field of Classification Search
CPC ..... G06F 21/36; G06F 21/32; G06K 9/00281; G06K 9/0061; G06K 9/00617; G06K 9/00288; G06K 9/00214; G06T 17/05; H04N 2201/3235
See application file for complete search history.

(56) References Cited

U.S. PATENT DOCUMENTS

| | | | |
|---|---|---|---|
| 8,261,090 B1 * | 9/2012 | Matsuoka | H04L 63/102 713/186 |
| 8,855,300 B2 | 10/2014 | Weis et al. | |
| 9,349,035 B1 * | 5/2016 | Gerber | G06K 9/00013 |

(Continued)

OTHER PUBLICATIONS

Ortega et al, Biometric authentication using digital retinal images, 2006, WSEAS International Conference on Applied Computer Science (Year: 2006).*

*Primary Examiner* — Christopher C Harris
(74) *Attorney, Agent, or Firm* — Boudwin Intellectual Property; Daniel Boudwin

(57) ABSTRACT

A system for visual password input. The system for visual password input includes an electronic device having a display, wherein the electronic device further includes a camera. A processor disposed within the electronic device includes a non-transitory computer readable memory having a logic thereon, wherein the logic provides a login screen to the display, wherein the login screen prevents access to the electronic device until an authentication signal is verified. The authentication signal comprises an image capture received by the camera, wherein the image capture is compared to an image data of a password object stored on the non-transitory computer readable memory and analyzed to determine whether the image capture matches the image data of the password object within a confidence interval. Access is then provided to the electronic device if the image capture matches the image data of the password object.

13 Claims, 2 Drawing Sheets

(56) References Cited

U.S. PATENT DOCUMENTS

| | | | |
|---|---|---|---|
| 2001/0037468 A1 | 11/2001 | Gaddis | |
| 2006/0056664 A1* | 3/2006 | Iwasaki | G07C 9/37 |
| | | | 382/115 |
| 2009/0210939 A1 | 8/2009 | Xu et al. | |
| 2011/0033091 A1* | 2/2011 | Fujii | A61B 3/1225 |
| | | | 382/117 |
| 2013/0182279 A1* | 7/2013 | Yano | H04N 1/00854 |
| | | | 358/1.14 |
| 2014/0079296 A1* | 3/2014 | Cleland | G06F 21/32 |
| | | | 382/117 |
| 2014/0250517 A1 | 9/2014 | Kim et al. | |
| 2015/0049922 A1* | 2/2015 | Miller | G06K 9/00255 |
| | | | 382/118 |
| 2015/0304323 A1 | 10/2015 | Alsina et al. | |
| 2016/0063235 A1* | 3/2016 | Tussy | G06K 9/00288 |
| | | | 726/6 |
| 2017/0124382 A1* | 5/2017 | Horovitz | G06K 9/00201 |
| 2017/0171177 A1* | 6/2017 | Eramian | G06K 9/00885 |
| 2017/0277880 A1* | 9/2017 | Todasco | G06F 3/0482 |
| 2019/0080066 A1* | 3/2019 | Van Os | G06K 9/00255 |
| 2020/0057888 A1* | 2/2020 | Angelakos | G06K 9/00677 |

\* cited by examiner

SYSTEM FOR VISUAL PASSWORD INPUT AND METHOD FOR ACCEPTING A VISUAL PASSWORD INPUT

CROSS REFERENCE TO RELATED APPLICATIONS

This application claims the benefit of U.S. Provisional Application No. 62/466,972 filed on Mar. 3, 2017. The above identified patent application is herein incorporated by reference in its entirety to provide continuity of disclosure.

BACKGROUND OF THE INVENTION

The present invention relates to a system for accepting a visual password input. Specifically, the present invention relates to systems that prevent access to an electronic device until a visual password input is verified to match an image of an existing password object.

Many people use multiple different passwords for various online accounts. Generally, this requires a user to enter a typed password to access these accounts, including banking, email, and the like. Potential breaches of security regarding these accounts can lead to extreme damage to the user, including loss of assets or identity theft. Frequently, users attempt to make passwords stronger by including variations, such as case-sensitivity and including numbers or symbols within the password. While this does make the password objectively stronger, these passwords are often difficult for the user to remember, leading to frustration, and in the worst case, losing access to the account indefinitely. Therefore, a system and method of verifying an individual's identity to grant access to a secure account that does not require password memorization is desired.

In light of the devices disclosed in the known art, it is submitted that the present invention substantially diverges in design elements from the known art and consequently it is clear that there is a need in the art for an improvement to existing systems for accepting passwords. In this regard, the instant invention substantially fulfills these needs.

SUMMARY OF THE INVENTION

In view of the foregoing disadvantages inherent in the known types of systems for visual password input now present in the known art, the present invention provides a system for visual password input wherein the same can be utilized for providing convenience for the user when attempting to log into an electronic device preventing access to unauthenticated users.

The present system comprises an electronic device having a display and a camera, wherein the electronic device further comprises a processor having a non-transitory computer readable memory having a logic thereon. The logic is configured to provide a login screen to the display, wherein the login screen is configured to prevent access to the electronic device until an authentication signal is verified. The authentication signal comprises an image capture received from the camera, wherein the image capture is compared with an image data of a password object stored on the non-transitory computer readable memory. The logic further analyzes the image capture to determine whether the image capture matches the image data of the password object within a confidence interval, wherein the logic then provides access to the electronic device if the image capture is determined to match the image data of the password object. In some embodiments, the password object comprises a face, such that the image capture is analyzed using a facial recognition algorithm. In another embodiment, the password object comprises a retina, such that the image capture is analyzed using a retinal scanning algorithm. In other embodiments, the logic is further configured to generate a three-dimensional model of the password object within the image. In yet another embodiment, the logic is configured to compare the image capture to the three-dimensional model. In some embodiments, the electronic device further comprises a wireless transceiver operably connected to the processor, wherein the wireless transceiver is in communication with a remote device. In another embodiment, the image data of the password object is stored within a non-transitory computer readable memory disposed on the remote device.

The present method comprises scanning a password object using a camera operably connected to an electronic device, storing an image data of the password object on a non-transitory computer readable memory, displaying a login screen on a display of the electronic device, preventing access to the electronic device until an authentication signal is verified, receiving an image capture from the camera, comparing the image capture with the image data of the password object, analyzing the image capture to determine whether the image capture matches the image data of the password object within a confidence interval, and providing access to the electronic device if the image capture is determined to match the image data of the password object. In some embodiments, the non-transitory computer readable memory is disposed within a remote device in wireless communication with the electronic device. In another embodiment, the method further comprises retrieving the image data of the password object from the remote device. In other embodiments, the method further comprises generating a three-dimensional model of the password object within the image.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
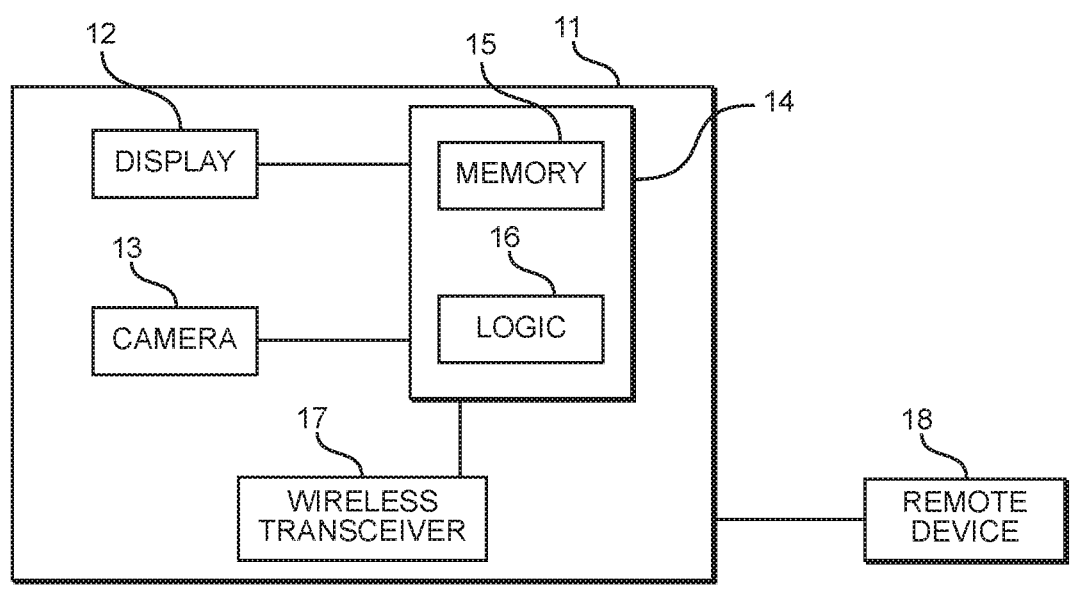
FIG. 1 shows a schematic view of an embodiment of the system for visual password input.

Reference is made herein to the attached drawings. Like reference numerals are used throughout the drawings to depict like or similar elements of the system for visual password input. The figures are intended for representative purposes only and should not be considered to be limiting in any respect.

Referring now to FIG. 1, there is shown a schematic view of an embodiment of the system for visual password input. The system for visual password input comprises an electronic device 11 having a display 12 and a camera 13 operably connected to a processor 14. In some embodiments, the electronic device 11 comprises a personal computer, such as a desktop or laptop, however in alternate embodiments, the electronic device 11 comprises a mobile device, such as a smartphone or tablet. The processor 14 comprises a logic 16 and a non-transitory computer readable memory 15 thereon. In the illustrated embodiment, the electronic device 11 is wirelessly connected to a remote device 18 via a wireless transceiver 17 disposed within the electronic device 11. In some embodiments, the non-transitory computer readable memory 15 comprises an image data of a password object thereon, whereas in alternate embodiments, the image data of the password object is disposed within a memory of the remote device 18. In this way, the user can access the electronic device 11 via verification with the remote device 18, such as cloud storage, thereby allowing the user to remotely access accounts over a variety of electronic devices 11. The image data of the password object can comprise a variety of objects, including but not limited to, a physical object, a user's face, a user's retina, or an image in either a physical or digital format. In this way, the user can select a desired unique object to act as the user's password object, wherein the same can be used for comparison to the stored image data of the password object.

The logic 16 is configured to provide a login screen to the user on the display 12, wherein the login screen prevents access to the electronic device 11 or a specific online user account until the user is authenticated by producing the password object. The login screen further prompts the user to present the password object to the camera 13, such that the password object can be compared to the image data of the password object stored on the non-transitory computer readable memory 15. The logic 16 is further configured to receive an image capture from the camera 13, wherein the image capture from the camera 13 is further compared to the image data of the password object stored on the non-transitory computer readable memory 15. The image capture is then analyzed via one of several image recognition algorithms, wherein the algorithm used varies based on the composition of the password object, such as facial recognition, retinal scanning, three-dimensional modelling, and the like. If the analysis returns a match within a given confidence interval, the logic 16 is configured to provide access to the electronic device 11. In this way, the logic 16 is configured to determine whether the image capture from the camera 13 is of the same password object as originally scanned and stored on the non-transitory computer readable memory 15. The confidence interval can vary, such that the image capture must match the image data of the password object to varying degrees as desired by the user for security purposes. For example, the logic 16 may be required to determine if the visual input is greater than or equal to a 95% match, wherein the 5% remaining can represent minor differences caused by changes in positioning, lighting, and the like.

In cases where the password object comprises the face of a user, the algorithm used to analyze the password object comprises a facial recognition algorithm. Different varieties of facial recognition can be used to minimize errors inherent with each independent facial recognition method. For example, the logic 16 can analyze the face of the user by identifying landmarks on the user's face and comparing these landmarks to those found on the image data of the password object stored on the non-transitory computer readable memory 15. These landmarks can be generated using geometric algorithms used to identify distinguishing features and photometric algorithms utilizing statistical analysis to apply values to the image to compare with the template image. The number of landmarks used can vary to provide varying degrees of precision in identifying the user's face. In this way, the system can accurately and precisely identify the user's face, while minimizing computer resource usage.

These methods of comparing identified landmarks and comparing them to identified landmarks in the image data of the password object decrease the computation time and power required by the system, thereby increasing efficiency of the system to improve the function thereof. In the alternative, if the system were to compute an infinite number of reference points or landmarks across a user's face, the efficiency of the system would be significantly decreased, while the accuracy of identification would not be significantly improved.

In one embodiment, the password object comprises an eye of the user, the algorithm used can include retinal scanning, wherein a low-intensity infrared light is projected into the eye of the user to illuminate the retinal structure of the user. When the retinal blood vessels are exposed to infrared light, the blood vessels are highlighted such that the blood vessels are easily distinguished from the surrounding retinal tissue, producing a retinal pattern. This network of blood vessels within a user's retina is unique and can be compared against a previously scanned retinal pattern.

In one embodiment, a physical object is used as the password object, the logic 16 is configured to analyze the password object after creating a three-dimensional model of the physical object, such as by generating a wireframe model of the object, wherein each vertex of the wireframe represents a landmark feature of the physical object. The relative position of each vertex of the wireframe model can be compared against a wireframe model generated of the originally scanned password object. In some embodiments, the facial recognition algorithm can include a three-dimensional analysis of the face of the user, such that variations in lighting do not have an effect on the comparison of the password object and the face of the user. This method of object identification requires the user to rotate and manipulate the object in front of the camera 13, such that the object can be three-dimensionally modelled. This provides more data to use for the password object than would otherwise be required for an image, thereby increasing the security of the system.

Figure 2:
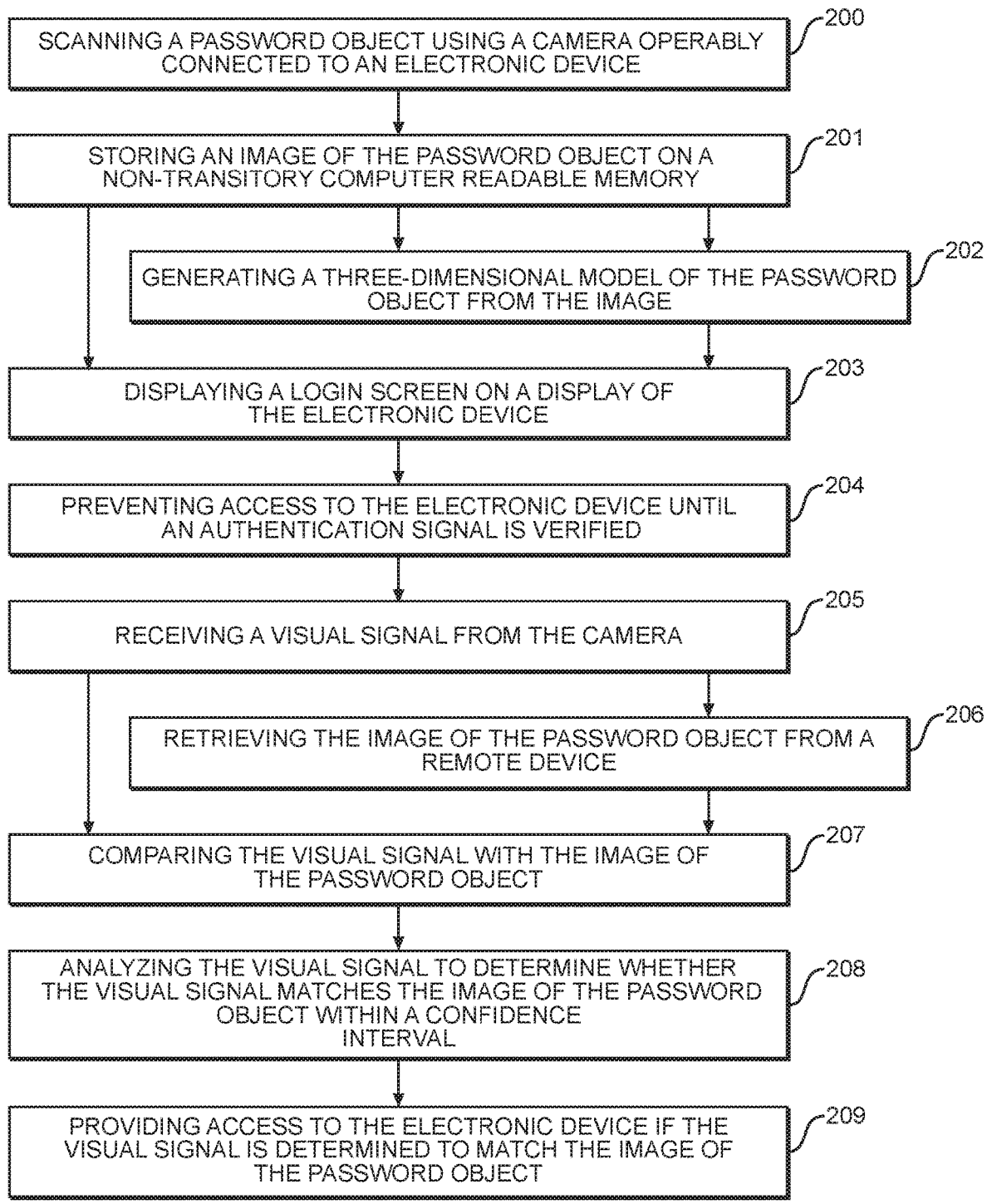
FIG. 2 shows a flowchart of an embodiment of the method for accepting a visual password input.

Referring now to FIG. 2, there is shown a flowchart of an embodiment of the method for accepting a visual password input. The method for accepting a visual password input comprises scanning 200 the password object using the camera operably connected to the electronic device, wherein the user selects the desired password object and uses the camera to create an image data of the password object to be registered as the user's desired password object. The image data of the password object is then stored 201 on the non-transitory computer readable memory, wherein in some embodiments the non-transitory computer readable memory is disposed on the processor of the electronic device, while in an alternate embodiment, the non-transitory computer readable memory is disposed within a remote device wirelessly connected to the electronic device. In some embodiments, the method further comprises generating 202 a three-dimensional model of the password object from the image, wherein the model is used for comparison purposes when a three-dimensional modelling algorithm is used to analyze the password object.

The electronic device then displays 203 a login screen, wherein the login screen is configured to prevent 204 access to the electronic device until the password object is verified to match the image data of the password object. The login screen is further configured to prompt the user to hold the password object to the camera for scanning. The processor then receives 205 an image capture from the camera, wherein the image capture comprises the image data of the password object held to the camera. In some embodiments, the method further comprises retrieving 206 the image data of the password object from a remote device, wherein the remote device allows the user to access accounts from multiple devices by querying the remote device for the image data of the password object. The image capture is then compared 207 to the image data of the password object and analyzed 208 to determine whether the image capture matches the image data of the password object within a predetermined confidence interval. Once the image capture is verified to match the image data of the password object, the processor then provides 209 access to the electronic device, thereby allowing the user to access the desired account. In some embodiments, the electronic device is further configured to issue an audible alert when the image capture is confirmed to match the image data of the password object, thereby informing the user that the visual password was accepted.

In one exemplary use, the user creates an account for a desired service, such as banking, email, or the like. In an alternate embodiment, the user creates a user login for an electronic device. In place of using a text-based password input, the user instead scans a desired password object such that an image data of the password object is stored within a memory, such as an on-board non-transitory computer readable memory disposed on the processor of the electronic device, or on a non-transitory computer readable memory disposed on a remote device, such as cloud storage. Traditional account features, such as security questions used for verifying a user's identity should a password reset request be input can also be included. After the password object is scanned, whenever a user desires to login to the account or electronic device, the user must hold the password object within view of the camera, such that the password object can be scanned and compared to the image data of the password object on file. Should the processor determine that the password object matches the stored image within a desired confidence interval, the user is granted access to the account or electronic device.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for visual password input, comprising:
   an electronic device having a display and a camera;
   wherein the electronic device further comprises a processor having a non-transitory computer readable memory having a logic thereon;
   wherein the logic is configured to:
     provide a login screen to the display, wherein the login screen is configured to prevent access to the electronic device until an authentication signal is verified;
     wherein the authentication comprises an image capture;
     receive the image capture from the camera;
     compare the image capture with image data of a password object stored on the non-transitory computer readable memory;
     wherein the password object comprises a physical object distinct from a user;
     wherein the physical object is selected from a group consisting of: a three-dimensional object and a physical image;
     analyze the image capture to determine whether the image capture matches the image data of the password object equal to or above a confidence interval;
     provide access to the electronic device if the image capture is determined to match the image data of the password object.

2. The system for visual password input of claim 1, wherein the logic is further configured to generate a three-dimensional model of the password object within the image, wherein a wireframe having a plurality of vertices is superimposed over each of the image data of the password object and the image capture.

3. The system for visual password input of claim 2, wherein the logic is configured to compare relative positions of the plurality of vertices of the image capture to the plurality of vertices of the image data of the password object.

4. The system for visual password input of claim 1, wherein the electronic device further comprises a wireless transceiver operably connected to the processor, wherein the wireless transceiver is in communication with a remote device.

5. The system for visual password input of claim 4, wherein the image data of the password object is stored on the remote device.

6. The system for visual password input of claim 1, wherein the confidence interval is 95%.

7. The system for visual password input of claim 1, wherein the electronic device is further configured to emit an audible alert when the logic determines that the image capture matches the stored image data of the password object.

8. A method for accepting a visual password input, comprising:
   scanning a password object using a camera operably connected to an electronic device;
   wherein the password object comprises a physical object distinct from a user;
   wherein the physical object is selected from a group consisting of: a three-dimensional object and a physical image;
   storing an image data of the password object on a non-transitory computer readable memory;
   displaying a login screen on a display of the electronic device;
   preventing access to the electronic device until an authentication is verified;
   receiving an image capture from the camera;
   comparing the image capture with the image data of the password object;

analyzing the image capture to determine whether the image capture matches the image data of the password object equal to or above a confidence interval;

providing access to the electronic device if the image capture is determined to match the image data of the password object.

9. The method for accepting a visual password input of claim 8, wherein the non-transitory computer readable memory is disposed within a remote device in wireless communication with the electronic device.

10. The method for accepting a visual password input of claim 9, further comprising retrieving the image data of the password object from the remote device.

11. The method for accepting a visual password input of claim 8, further comprising rotating the password object in view of the camera and generating a three-dimensional model of the password object as the image data.

12. The method for accepting a visual password input of claim 8, wherein the image capture comprises a three-dimensional model generated by rotating an object in view of the camera.

13. A method for accepting a visual password input, consisting of:

scanning a password object using a camera operably connected to an electronic device;

wherein the password object comprises a physical object distinct from a user;

rotating the password object in view of the camera to scan an entirety thereof;

generating a three-dimensional model of the password object as an image data;

storing the image data of the password object on a non-transitory computer readable memory;

displaying a login screen on a display of the electronic device;

preventing access to the electronic device until an authentication is verified;

receiving an image capture from the camera;

wherein the image capture comprises a three-dimensional model of an object rotated in view of the camera;

comparing the image capture with the image data of the password object;

analyzing the image capture to determine whether the image capture matches the image data of the password object equal to or above a confidence interval;

providing access to the electronic device if the image capture is determined to match the image data of the password object.

* * * * *